United States Patent
Ma et al.

(10) Patent No.: US 7,596,212 B2
(45) Date of Patent: Sep. 29, 2009

(54) METHOD FOR A CALLING PARTY TO REINITIATE A CALL IN CARD NUMBER SERVICE

(75) Inventors: Haiyin Ma, Guangdong (CN); Shengjun Xu, Guangdong (CN); Deyong Li, Guangdong (CN); Sheng Yi, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 73 days.

(21) Appl. No.: 10/588,885

(22) PCT Filed: Dec. 26, 2005

(86) PCT No.: PCT/CN2005/002313

§ 371 (c)(1),
(2), (4) Date: Nov. 14, 2006

(87) PCT Pub. No.: WO2006/069529

PCT Pub. Date: Jul. 6, 2006

(65) Prior Publication Data

US 2007/0165828 A1  Jul. 19, 2007

(30) Foreign Application Priority Data

Jan. 2, 2005  (CN) .................. 2005 1 0005405

(51) Int. Cl.
*H04M 15/00* (2006.01)
*H04M 3/42* (2006.01)

(52) U.S. Cl. ............... 379/114.15; 379/114.2; 379/207.02

(58) Field of Classification Search ........... 379/114.15, 379/114.2, 207.02, 210.01, 283, 355.01; 370/259, 236, 352, 401, 426, 453, 457
See application file for complete search history.

(56) References Cited

U.S. PATENT DOCUMENTS

| 5,187,740 | A  | * | 2/1993 | Swaim et al. ........... 379/209.01 |
| 6,201,861 | B1 | * | 3/2001 | Pykalisto .............. 379/201.01 |
| 2001/0005382 | A1 | * | 6/2001 | Cave et al. ................. 370/466 |
| 2002/0097854 | A1 |   | 7/2002 | Bauer |
| 2003/0193961 | A1 |   | 10/2003 | Moore et al. |

FOREIGN PATENT DOCUMENTS

EP  1109368  6/2001

OTHER PUBLICATIONS

V. Bharatia et al; "Internet Draft; draft-culpepper-sip-infor-event-00.txt; SIP INFO Method for Event Reporting"; Internet Engineering Task Force, Apr. 18, 2000, pp. 1-10 XP002206928.

(Continued)

*Primary Examiner*—Quoc D Tran
(74) *Attorney, Agent, or Firm*—Ladas & Parry LLP (57) ABSTRACT

The present invention relates to communication techniques, and discloses a method for the calling party to reinitiate a call in card number service, so that the calling party in card number service can conveniently release his current call and reinitiate a new call. In the present invention, the call controller instructs the calling gateway to detect the preset key combination in the session, if the calling gateway detects the key combination, then reports it to the call controller, and the call controller sends a message to the called party to release the call and releases the called party, and simultaneously sends an indication that the called party has hung up to SCP and waits for the calling party to dial again. The present invention enables the calling party to control his dial completely by himself, so as to dramatically save the time for the calling party of card number service to initiate a new call, and make the services more user-friendly. At the same time, the technical solution of the present invention also alleviates network load to the maximum extent.

14 Claims, 3 Drawing Sheets

OTHER PUBLICATIONS

B. Rosen; "VOIP Gateways and the Megaco Architecture" BT Technology Journal, Springer, Dordrecht, NL, vol. 19, No. 2, Apr. 1, 2001, pp. 66-76, XP001034589.

Tom Taylor; "Megaco/H248: A New Standard For Media Gateway Control"; IEEE Communications Magazine, IEEE Service Center New York, NY, US, vol. 38, No. 10, Oct. 2000, pp. 124-132, XP000969735.

European Search Report-PCT/CN2005002313-mailed Feb. 4, 2008.

* cited by examiner

METHOD FOR A CALLING PARTY TO REINITIATE A CALL IN CARD NUMBER SERVICE

Cross Reference To Priority Application

This application claims the benefit of CN Application Ser. No. 200510005405.5 filed on Jan. 2, 2005 and entitled "A Method for a Calling Party to Reinitiate a call in Card Number Service".

FIELD OF THE TECHNOLOGY

The present invention relates to communication techniques, and more particularly to a method for a calling party to reinitiate a call in card number service in communication techniques.

BACKGROUND OF THE INVENTION

With the advent of the $21^{st}$ Century, IT industry is rapidly developing. The major basic telecommunication operators and value-added telecommunication service operators are fiercely competing among themselves. In order to enhance their market shares that might change quickly, all the telecommunication operators are trying to provide more services that are more attractive to users.

Intelligent network services have experienced rapid development to meet the demand. Those skilled in the art are aware of that some novel service functions like Call Waiting and Call Forwarding appear with the emergence of program control digital exchangers. These services can be regarded as intelligent services in the early phase, but their functions are simple and limited. Moreover, these functions are designed by the exchanger manufacturers. If the telecommunication operators hope to develop new services, they might encounter a lot of nuisances because they have to devise and change the software of their exchangers. A concept of intelligent network emerges following the increase of new phone services. Its basic idea is that the exchanger only works for the basic functions of exchange and connection, and all the new functions except the phone exchange, are shifted to the intelligent network. The intelligent network is not independent, instead it overlaps the existing program control exchange network. Theoretically, the new services that the intelligent network is able to provide are unlimited. With the evolution from the traditional telecommunication network based on the circuit exchange techniques to the telecommunication network based on soft switch, the soft switch device can also support the intelligent network services, and provide some new value-added services conveniently besides the traditional intelligent services.

The card number intelligent service is one of the services that the intelligent network can provide. Those skilled in the art know that the service means the user dials a special access number to get accessed to the program control exchanger, and with processing of the intelligent network, the exchanger uses the traditional circuit exchange techniques to build up a voice path between the calling party and the called party. Generally, the password account direct-dial services, for example, 9989 card and 201 card etc., fall into the category of the card number intelligent service.

The card number intelligent service provides great convenience to the users, and especially, the service attracts a large number of prepaid account card users, and substantially stops arrearage by the users of the service. However, the intelligent card number service also causes some inconvenience to the users, for example, if the calling party wants to stop the present calling and dials another phone number, he has to wait till the called party hangs up and he hears the intelligent voice prompts, then he can initiate another call, if he hangs up before the called party releases the call, he has to dial the access number and input the information including the long card number and password etc. again before he can initiate a new call to another user.

Additionally, the existing techniques may bind the card number with the phone set so as to omit dialing of the card number and password, but binding and unbinding also need independent operations.

SUMMARY OF THE INVENTION

In view of the above, the present invention is to provide a method for a calling party to reinitiate a call in card number service, so that the calling party of the card number service can release the present call and reinitiate a new call.

The technical solution in accordance with the present invention is achieved as follows:

A method for a calling party to reinitiate a call in card number service, the method further includes:

a call controller instructing a calling gateway to detect a preset key combination in a session;

when having detected the calling party dialing the key combination, the calling gateway reporting a first event message to the call controller;

the call controller responding to the first event message, releasing the current call, sending an indication that the called party has hung up to a Service Control Point(SCP), prompting and waiting for the calling party to initiate a new call via the calling gateway.

The method further includes: upon having collected the new number dialed by the calling party, the calling gateway sending a report to the call controller to initiate a new calling process.

Wherein the call controller and the calling gateway adopt Media Gateway Control Protocol (MGCP) between them; and in said step of a call controller instructing a calling gateway to detect a preset key combination in a session, the call controller instructs the calling gateway to detect the preset key combination in the session via Modify Connection massage whose parameters are Session Descriptive Protocol (SDP) and the key combination Digitmap;

in said step of the calling gateway reporting a first event message to the call controller when having detected the calling party dialing the key combination, the first event message is Notify message;

in said step of the call controller responding to the first event message, releasing the current call, sending an indication to a Service Control Point(SCP), prompting and waiting for the calling party to initiate a new call via the calling gateway, the call controller instructs the calling gateway to collect the new call number dialed by the calling party via Request Notify message whose parameters are DialTone and Normal MGCP Digitmap.

Wherein, in said step of the calling gateway sending a report to the call controller to initiate a new calling process upon having collected the new number dialed by the calling party, the calling gateway reports the collected new call number of the calling party to the call controller via Notify message.

Wherein the call controller and the calling gateway adopt Protocol H.248 between them; and in said step of a call controller instructing a calling gateway to detect a preset key combination in a session, the call controller instructing the calling gateway to detect the preset key combination via Modify_Request message whose parameters are Session Descriptive Protocol (SDP) and the key combination Digitmap;

in said step of the calling gateway reporting a first event message to the call controller when having detected the calling party dialing the key combination, the first event message is Notify_Request message;

in said step of the call controller responding to the first event message, releasing the current call, sending an indication to a Service Control Point(SCP), prompting and waiting for the calling party to initiate a new call via the calling gateway, the call controller instructs the calling gateway to collect the new call number dialed by the calling party via Modify_Request message whose parameters are DialTone and Normal H.248 Digitmap.

Wherein, in said step of the calling gateway sending a report to the call controller to initiate a new calling process upon having collected the new number dialed by the calling party, the calling gateway reports the collected new call number of the calling party to the call controller via Notify_Request message.

In above scheme, the call controller is a Service Switch Point (SSP) or a soft switch device.

In above scheme, the key combination is any random combination of all the keys.

It is shown by comparison that, the main difference between the present invention technical schemes and the existing techniques is: the call controller instructs the calling gateway to detect the preset key combination in the session; and if the calling gateway detects the key combination, it reports the combination to the call controller, and the call controller sends a call releasing message to release the called party, and simultaneously informs SCP that the called party hangs up and waits for the redialing of the calling party.

Relying on the difference, the present invention technical schemes can bring apparent benefits, i.e., the users of the card number service just need dial several keys (for instance "# #") to release his current card number calling and is able to dial a new number immediately following the system's prompt instruction, so as to initiate a new call. However, the user of the card number service using the existing techniques has to wait for the called party to hang up before initiating a new call, or the calling party hangs up and starts a new call by dialing a long string of digits, including access number, card number and password number etc.(which usually exceeds 20 digits, and the calling party needs to redial if he makes a mistake). Therefore, in contrast to the existing techniques, the calling party in the present invention can control the call process all by himself, so as to dramatically save the time for the calling party of the card number service to initiate a new call, and make the services more user-friendly. At the same time, the technical solution of the present invention also alleviates the network load to the maximum extent.

DETAILED DESCRIPTION OF PREFERRED EMBODIMENTS

The preferred embodiments of the present invention are presented with reference to the drawings as follows.

In light of the shortcomings of the practical card number intelligent service provided by the existing traditional intelligent networks, the embodiments of present invention put forward a new solution, which allows the calling party of the card number service to release his current call actively by dialing a special key combination that can be configured such as "##", and then initiate a new call by dialing the number of another called party following the intelligent voice prompt, instead of waiting for the previous called party, whom he is talking with, to hang up to release the current call and dialing the number of another called party following the intelligent voice prompt, or the calling party actively hanging up to release his current call and initiating a new call by dialing again a long string of digits including access number, card number and password number etc. The embodiments of the present invention can be achieved with modification of the exiting intelligent networks or relying on the new generation of soft switch device, if there are any other systems that can support the card number intelligent service, the embodiments of the present invention can also be achieved on the basis thereof.

Figure 1:
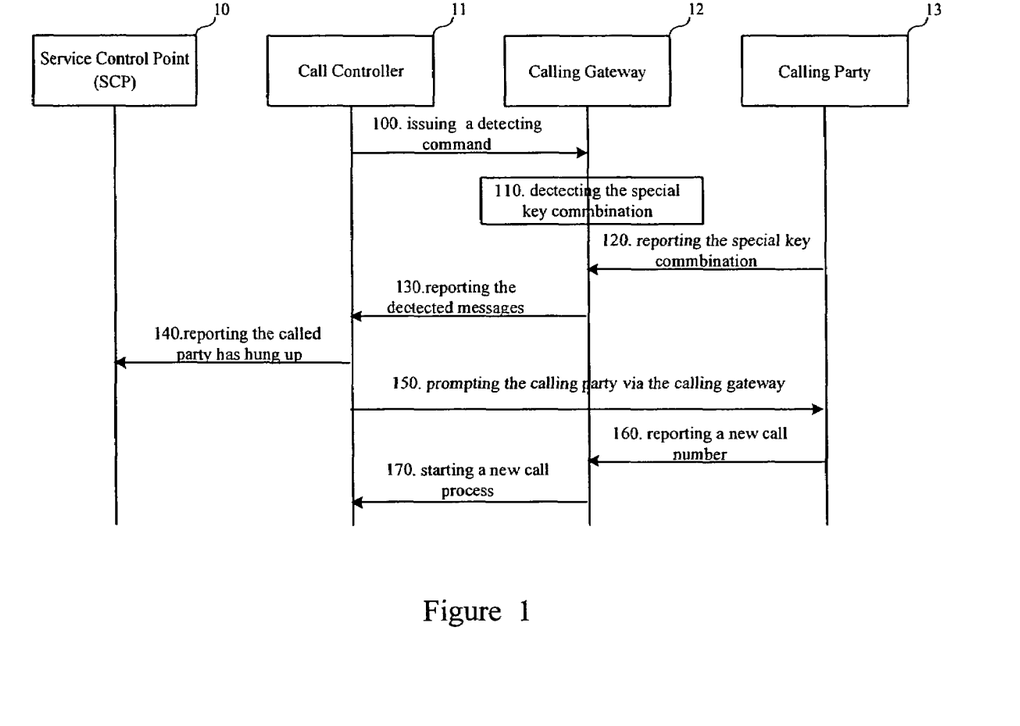
FIG. 1 is a schematic flowchart illustrating signaling of system embodiment in accordance with the present invention.

FIG. 1 is a schematic flowchart illustrating an embodiment of the present invention. In FIG. 1, Service Control Point (SCP) 10, Call Controller 11, Calling Gateway 12 and Calling Party 13 are the key parts in the whole system. It should be noted that, if the embodiment of the present invention is achieved on the existing intelligent networks, then Call Controller 11 is the Service Switch Point (SSP) of the traditional intelligent networks. SSP is generally integrated on the digital program control exchanger. If the system is achieved with soft switch system architecture, then Call Controller 11 is the soft switch device. If there are any other systems supporting the card number intelligent service, then Call Controller 11 is the corresponding device in the system. The embodiments of the present invention are presented in combination of soft switch and SCP, with Media Gateway Control Protocol (MGCP) or Gateway Control Protocol (H.248) terminal taken as the examples, therefore, Call Controller 11 is actually the soft switch device, Calling Gateway 12 adopts the media gateway of MGCP or H.248 protocol, and the equipment adopted by Calling Party 13 is actually the MGCP/H.248 terminal. It should be noted that, the soft switch system architecture involves three parts: signaling gateway, media gateway and media gateway control, with standard MGCP and H.248 protocol adopted to achieve the separation of call control and bearer control.

Interaction among the key equipments is described in detail according to the flowchart in FIG. 1 as follows:

In Step 100, when Calling Party 13 enters the card number call process by the standard card number call interactive operation and the called party replies, i.e., the call succeeds, Call Controller 11 issues a detecting command to Calling Gateway 12 in the home network of Calling Party 13, instructing Calling Gateway 12 to detect the special key combination that Calling Party 13 might dial at any moment in the session between Calling Party 13 and the called party, wherein, the key combination is set up beforehand. The soft switch system adopts the mode in which the soft switch device issues digits-collecting request to the gateway to which the calling party belongs, and different modes like Digitmap or immediate report can be adopted to request a detection for voice frequency dialing of special events. It should be noted that, Digitmap is a type of special events specified in MGCP/H.248 protocol, and it is issued by Call Controller 11 to Calling Gateway 12, and the parameters contained in it are the specified events to be detected by Calling Gateway 12, these events are one or plural columns of digit strings that are listed according to a certain order, and each column corresponds to an event sequence instead of a separate event. When the detected digit string matches one column in the detect event command, Calling Gateway 12 sends a notify to Call Controller 11.

In Step 110, it is a process in which Calling Gateway 12 detects Calling Party 13 to monitor the calling party's dialing the preset key combination, and it is in fact to activate a process in Calling Gateway 12 to detect the user's dialing, which is well known to those skilled in the art, and once the condition is met, the process is triggered to make response.

In Step 120, when the calling party of the card number service, i.e., Calling Party 13 wants to dial another called party in the session, he dials the preset key combination, which is reported to Calling Gateway 12 and the next response is triggered.

In Step 130, Calling Gateway 12 detects that Calling Party 13 has dialed the preset key combination and reports the event message to Call Controller 11 immediately. In the soft switch system, the process is: Calling Gateway 12 converts the key combination dialed by Calling Party 13 into the card number service special event code that is preset, i.e., Calling Gateway 12 collects digits of the detected event and reports it to the soft switch device.

In the following Step 140, Call Controller 11 immediately makes response to the message and releases the current call initiated by Calling Party 13, and simultaneously sends the indication that the called party has hung up to SCP10, and it should be noted that, according to the conventional phone calling process, after Call Controller 11 receives the message that called party has actually hung up, it sends the indication that the called party has hung up to SCP10, but in this case, it neglects whether the called party has actually hung up, instead, Call Controller 11 automatically reports the message that the called party had hung up to SCP10 according to the preset special key combination. Similarly, the corresponding procedure in the soft switch system is: after it receives the special event code of the card number service dialed by the calling party in card number service, the soft switch device sends a call-released message to the called party and releases the called party, and simultaneously reports originating party hang up to SCP10 to instruct that the called party has hung up. It is well known to those skilled in the art that the Detect Point (DP) is used for triggering the intelligent call and detecting the call-related events in the intelligent call process, and it is one of the interfacing parameters for soft switch and SCP, it defines a Triggering Detection Point (TDP) at SSP for the corresponding service key to signify that SSP will trigger the intelligent services at the TDP or detect the call-related events in the intelligent call process. According to the specification, the range of the DP number is from 1 to 18 but 11, and every DP number describes a capacity-concentrated originating or terminal call model, of which, DP9 is to report originating party hang up. This step is important, because only when it receives the event reported by the soft switch that the called party has hung up, can SCP10 send an instruction of playing the prompt voice for the calling party to prompt the calling party to hang up, change password or dial another user. This is the conventional process of modern intelligent card number services, and this process must be used in the embodiments of the present invention so that SCP10 can permit the calling party to initiate a new call.

In Step 150, Call Controller 11 prompts Calling Party 13 via Calling Gateway 12 that he can initiate a new call, and waits for the calling party to dial a new called party number. The following steps starting from this one are similar to the steps of normal card number services when the current called party has hung up, no matter what the current called party's situation is, the current called party has hung up on the part of the key devices of the system.

In Step 160, the new calling number dialed by Calling Party 13 is reported to Calling Gateway 12.

In Step 170, after receiving the new call number dialed by Calling Party 13, Calling Gateway 12 reports it to Call Controller 11 to initiate a new call process, Call controller 11 prompts the user that he can initiate a new call and waits for him to redial. It should be noted that Call Controller 11 can successfully initiate a new call process because SCP10 has given Calling Party 13 the resources and authority to initiate a new call after Step 140 is completed.

As a summary of the above, according to embodiments of the present invention, the call controller releases the current called party by controlling and handling the preset key combination reported by the calling party in the use of intelligent card number services, and prompts the calling party to initiate a new call, so as to avoid the nuisances for the calling party to input the associated numbers again (including access number, card number and password number etc., usually exceeding 20 digits). Additionally, the embodiment of the present invention causes no affects on the common card number intelligent service processes.

The forgoing is a detailed description to the general system embodiment of the present invention, and the following is a description combining soft switch and SCP, with MGCP and H.248 terminals respectively taken as examples. The configured special event code is ##, i.e., when the calling party presses # twice successively in the session with the current called party, he can dial a new number to call another user. It should be noted that ## is only one of the key combinations for a special event code, and other key combinations, not limited to two keys, can also be adopted, that is to say, the key combination for special event code can be any random combination of all the keys, such as **, #*#, #91#, and so on, which have the same effect. The following is a further description of the embodiments of the present invention in regard to the specific case.

Figure 2:
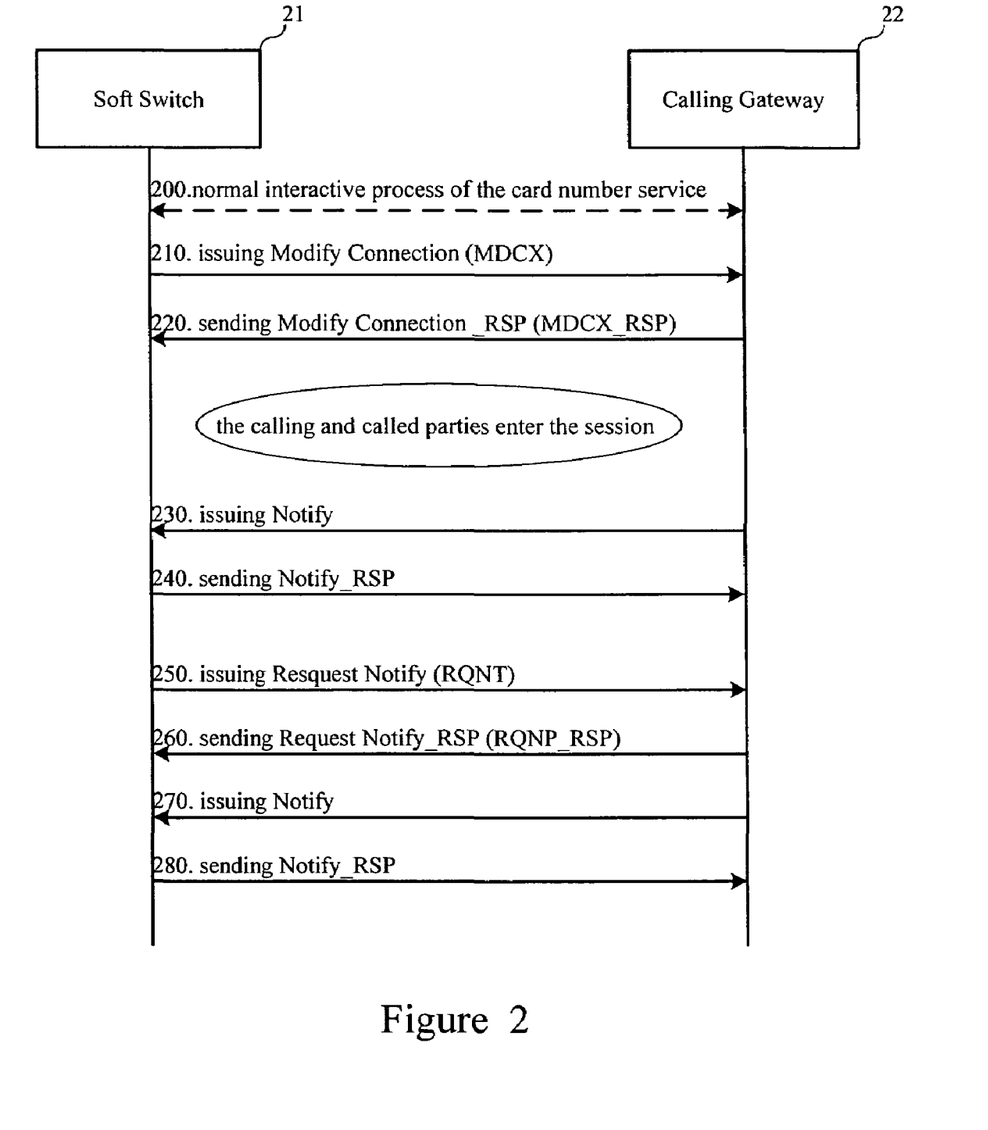
FIG. 2 is a schematic flowchart illustrating signaling of an embodiment adopting MGCP between the calling gateway and soft switch in accordance with the present invention.

One embodiment of soft switch system adopting MGCP terminal in accordance with the present invention is introduced firstly. FIG. 2 is the interactive flowchart between a soft switch and gateway. Compared with FIG. 1, Soft Switch 21 performs the function of Call Controller 11, and the function of Calling Gateway 22 is similar to that of Calling Gateway 11 in FIG. 1, but it specially supports MGCP.

In Step 200, it is the normal interactive procedures of the card number service among Soft Switch 21, SCP and Calling Gateway 22, that is the conventional procedures of the intelligent networks for the calling party to dial the access number, card number, password and the called party's number, and when these normal procedures are completed, the called party has picked up the phone receiver and prepares to enter the session.

In Step 210, Soft Switch 21 issues a message to Calling Gateway 22, and this message is Modify Connection (MDCX) attribute message issued by the media gateway controller to the media gateway in the MGCP. According to the embodiment of the present invention, Soft Switch 21 works as the media gateway controller in the MGCP, and Calling Gateway 22 is the media gateway in the MGCP, the attribute of MDCX issued in this step includes Session Description Protocol (SDP) and Digitmap. Wherein, the Digitmap includes the preset special event code ##. It should be noted that, SDP is the specific protocol adopted by the media gateway controller to describe the connection parameters to the media gateway in the MGCP, and the special event code ## is the key combination to be monitored.

In Step 220, Calling Gateway 22 sends a response to MDCX message issued by Soft Switch 21, and the response is called Modify Connection_RSP (MDCX_RSP) message in the MGCP.

After Step 220 is completed, Soft Switch 21 has instructed Calling Gateway 22 to detect the special key combination ## that the calling party might dial in the session between the calling and called parties. If the calling party keeps from dialing ## or neither of the calling and called parties hangs up, the calling and called parties enter and remain the session.

If the calling party dials ## in the session, then it enters Step 230. Call Gateway 22 reports the event to Soft Switch 21 as soon as it detects the event, and in MGCP the report message is called Notify (NTFY) command reported by the media gateway to the media gateway controller in the MGCP, and the parameters of the command mean that the calling party has dialed the ## keys.

Successively, Soft Switch 21 reports to SCP that the user has hung up and sends a response message to Calling Gateway 22 in Step 240, and in MGCP, the response is called Notify_RSP (NTFY_RSP), which includes OK parameter signifying that Soft Switch 21 has received the event reported by Calling Gateway 22 and is performing the successive procedures.

In Step 250, Soft Switch 21 issues Request Notify (RQNT) message to Calling Gateway 22, and the massage includes DialTone and Normal MGCP Digitmap parameters, wherein, the first parameter DialTone instructs Calling Gateway 22 to detect the dial tone, while the second parameter Normal MGCP Digitmap instructs Calling Gateway 22 to collect the called number dialed by the calling party according to normal calling Digitmap, and report the called number to Soft Switch 21 after they are all collected.

In Step 260, Calling Gateway 22 sends Request Notify_RSP (RQNP_RSP) to Soft Switch 21, wherein its parameter is OK signifying that Calling Gateway 22 has received the RQNT sent in Step 250.

At the moment, if the calling party dials another user's called number, then it enters Step 270, Calling Gateway 22 sends a report to Soft Switch 21 via the NTFY message as well, but the parameter included in the message turns into dials digits to another user, and this is the dial Digitmap that Call Gateway 22 requests to detect in RQNT of Step 250.

In Step 280, Soft Switch 21 responds to Calling Gateway 22, i.e., sends NTFY_RSP (OK) message to Calling Gateway 22.

Figure 3:
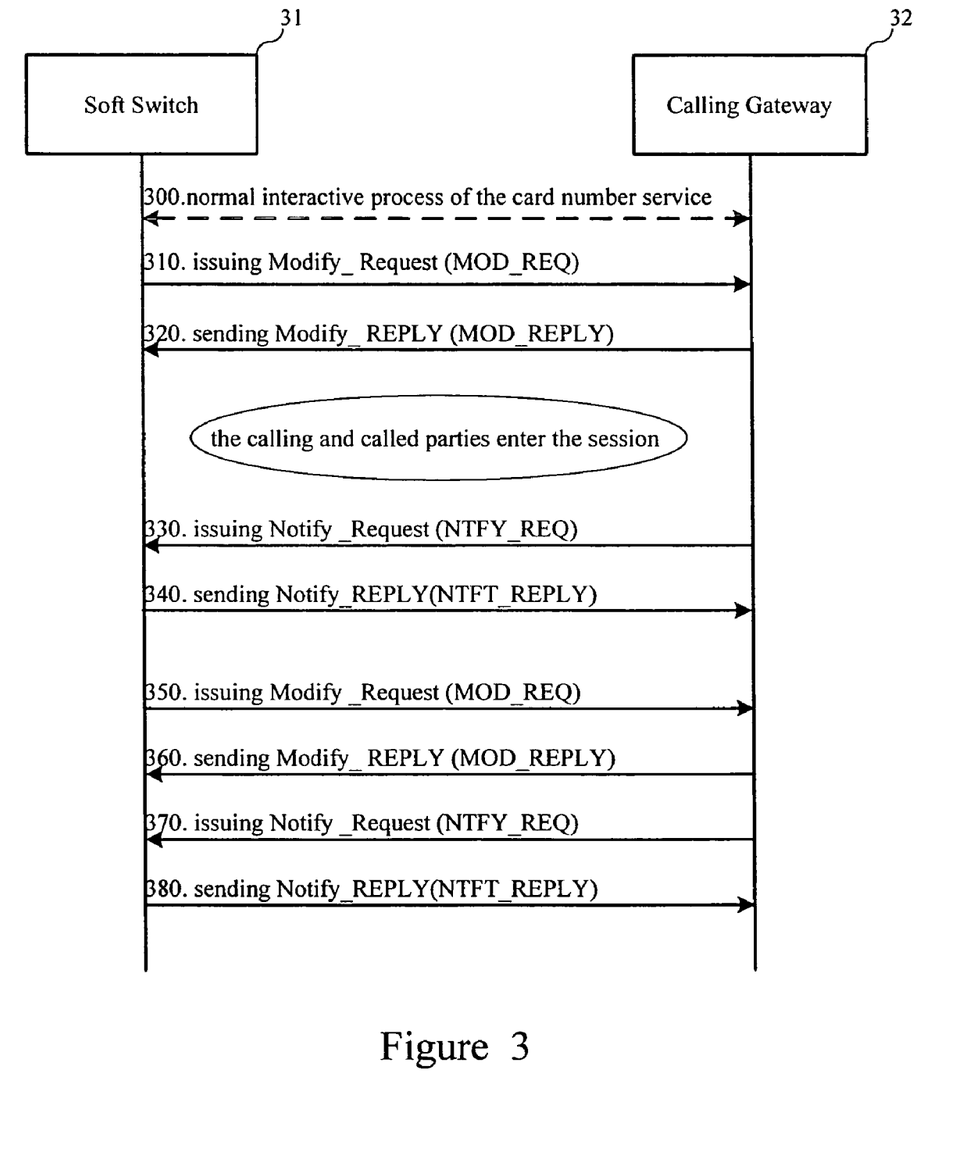
FIG. 3 is a schematic flowchart illustrating signaling of another embodiment adopting H.248 protocol between the calling gateway and soft switch in accordance with the present invention.

Another embodiment of the present invention in soft switch system adopting Protocol H.248-support terminal is presented in the following with reference to FIG. 3.

In step 300, it is the normal interactive procedures of the card number service among Soft Switch 31 as well, SCP and Calling Gateway 32, and after the normal procedures are completed, the called party has picked up the phone receiver and prepares to enter the session.

In Step 310, Soft Switch 31 also issues a message to Calling Gateway 32, and in Protocol H.248 system this message is terminal characteristics Modify_Request (MOD_REQ), whose parameters are SDP and Digitmap ##, and in fact, the message is the combination of MOD (SDP) and REQ (Digitmap ##), wherein, MOD (SDP) issues the media information of the called party to Calling Gateway 32, so that the calling and called parties can communicate with each other, and the message exists in the normal call procedures, while REQ (Digitmap##) is a message issued to achieve the new functions of the embodiment of the present invention, and it serves to instruct Calling gateway 32 to detect the key combination ## in the session, of course the key combination might also be other keys preset by Soft Switch 31 according to its own configuration.

In Step 320, Calling Gateway 32 sends a response to MOD_REQ issued by Soft Switch 31, and in MGCP, the response is called terminal characteristic Modify_REPLY (MOD_REPLY).

After Step 320 is completed, Soft Switch 31 has instructed Calling Gateway 32 to detect the special key combination ## that the calling party might dial in the session between the calling and called parties. Only when Calling Gateway 32 detects this key combination and reports it to Soft Switch 31, can Soft Switch 31 start the active redial procedure of the calling party in the card number service If the calling party dials ## in the session, then it enters Step 330. Calling Gateway 32 reports the event to Soft Switch 31 as soon as it detects the event and in H.248 protocol, the report message is called Notify Request (NTFY_REQ)whose parameter "A dials ##" signifies that the calling party has dialed the key combination ##.

Successively, Soft Switch 31 reports SCP that the called party has hung up, and sends a response message to Calling Gateway 32 in Step 340, in H.248 protocol, the response is called Notify_REPLY (NTFY_REPLY).

In step 350, Soft Switch 31 issues MOD_REQ to Calling Gateway 32, and the message includes the parameters such as DialTone, Normal H.248 Digitmap and etc., wherein, the first parameter DialTone instructs Calling Gateway 32 to detect dial tone as well, while the second parameter Normal H.248 Digitmap instructs Calling Gateway 32 to collect the called number dialed by the calling party according to normal calling Digitmap, and report the called number to Soft Switch 31 after they are all collected.

In Step 360, Calling Gateway 32 sends MOD_REPLTY to Soft Switch 31 to signify that Calling Gateway 32 has received MOD_REQ sent in Step 350.

At the moment, if the calling party dials another user's number, then it enters Step 370, Calling Gateway 32 sends a report to Soft Switch 31 via NTFY_REQ as well, but the parameter included in the message turns into dials digits to another user.

In Step 380, Soft Switch 31 responds to Calling Gateway 32, i.e., sends NTFY_REPLY message to Calling Gateway 32.

It is shown from the signaling flows of the two embodiments that they have many similarities, the major difference is that they use different commands, because Protocol H.248 is developed from MGCP, it expands the function limits that MGCP is only restrained in voice communication, and is able to provide multimedia services, therefore, it is normal to make use of MGCP in some places.

In light of the common phone service, similar methods can be adopted to achieve the call process for the calling party to dial a new call.

Although the present invention is illustrated and presented with some preferred embodiments of the present invention, the common technical persons in this field know that various changes can be made in both form and detail without deviating from the spirit and scope specified in the attached claims.

The invention claimed is:

1. A method for a calling party to reinitiate a call in card number service, comprising:
   a call controller instructing a calling gateway to detect a preset key combination in a session;
   when having detected the calling party dialing the key combination, the calling gateway reporting a first event message to the call controller;
   the call controller responding to the first event message, releasing the current call, sending an indication that the called party has hung up to a Service Control Point (SCP), prompting and waiting for the calling party to initiate a new call via the calling gateway; wherein sending the indication that the called party has hung up to the SCP neglects whether the called party has actually hung up.

2. The method according to claim 1, further comprising:
   upon having collected the new call number dialed by the calling party, the calling gateway sending a report to the call controller to initiate a new calling process.

3. The method according to claim 1, wherein, the call controller and the calling gateway adopt Media Gateway Control Protocol (MGCP) between them; and
   in said step of a call controller instructing a calling gateway to detect a preset key combination in a session, the call controller instructs the calling gateway to detect the preset key combination via Modify Connection massage whose parameters are Session Descriptive Protocol (SDP) and the key combination Digitmap;
   in said step of the calling gateway reporting a first event message to the call controller when having detected the calling party dialing the key combination, the first event message is Notify message;
   in said step of the call controller responding to the first event message, releasing the current call, sending an indication to a Service Control Point(SCP), prompting and waiting for the calling party to initiate a new call via the calling gateway, the call controller instructs the calling gateway to collect the new call number dialed by the calling party via Request Notify message whose parameters are DialTone and Normal MGCP Digitmap.

4. The method according to claim 2, wherein, the call controller and the calling gateway adopt Media Gateway Control Protocol(MGCP) between them; and
   in said step of a call controller instructing a calling gateway to detect a preset key combination in a session, the call controller instructs the calling gateway to detect the preset key combination via Modify Connection massage whose parameters are Session Descriptive Protocol (SDP) and the key combination Digitmap;
   in said step of the calling gateway reporting a first event message to the call controller when having detected the calling party dialing the key combination, the first event message is Notify message;
   in said step of the call controller responding to the first event message, releasing the current call, sending an indication to a Service Control Point(SCP), prompting and waiting for the calling party to initiate a new call via the calling gateway, the call controller instructs the calling gateway to collect the new call number dialed by the calling party via Request Notify message whose parameters are DialTone and Normal MGCP Digitmap.

5. The method according to claim 3, wherein, in said step of the calling gateway sending a report to the call controller to initiate a new calling process upon having collected the new number dialed by the calling party, the calling gateway reports the collected new call number of the calling party to the call controller via Notify message.

6. The method according to claim 1, wherein, the call controller and the calling gateway adopt Protocol H.248 between them; and
   in said step of a call controller instructing a calling gateway to detect a preset key combination in a session, the call controller instructs the calling gateway to detect the preset key combination via Modify_Request message whose parameters are Session Descriptive Protocol (SDP) and the key combination Digitmap;
   in said step of the calling gateway reporting a first event message to the call controller when having detected the calling party dialing the key combination, the first event message is Notify_Request message;
   in said step of the call controller responding to the first event message, releasing the current call, sending an indication to a Service Control Point(SCP), prompting and waiting for the calling party to initiate a new call via the calling gateway, the call controller instructs the calling gateway to collect the new call number dialed by the calling party via Modify_Request message whose parameters are DialTone and Normal H.248 Digitmap.

7. The method according to claim 2, wherein, the call controller and the calling gateway adopt Protocol H.248 between them; and
   in said step of a call controller instructing a calling gateway to detect a preset key combination in a session, the call controller instructs the calling gateway to detect the preset key combination via Modify_Request message whose parameters are Session Descriptive Protocol (SDP) and the key combination Digitmap;
   in said step of the calling gateway reporting a first event message to the call controller when having detected the calling party dialing the key combination, the first event message is Notify_Request message;
   in said step of the call controller responding to the first event message, releasing the current call, sending an indication to a Service Control Point(SCP), prompting and waiting for the calling party to initiate a new call via the calling gateway, the call controller instructs the calling gateway to collect the new call number dialed by the calling party via Modify_Request message whose parameters are Dial Tone and Normal H.248 Digitmap.

8. The method according to claim 5, wherein, in said step of the calling gateway sending a report to the call controller to initiate a new calling process upon having collected the new number dialed by the calling party, the calling gateway reports the collected new call number of the calling party to the call controller via Notify_Request message.

9. The method according to claim 1, wherein, the call controller is a Service Switch Point (SSP) or a soft switch device.

10. The method according to claim 2, wherein, the call controller is a Service Switch Point (SSP) or a soft switch device.

11. The method according to claim 1, wherein, the key combination is any random combination of all the keys.

12. The method according to claim 2, wherein, the key combination is any random combination of all the keys.

13. The method according to claim 1, wherein the call controller instructing the calling gateway to detect the preset key combination in the session comprises:

a soft switch device issues a digits-collecting request to the gateway in a soft switch system.

14. The method according to claim 1, wherein the call controller instructing the calling gateway to detect the preset key combination in the session comprises:

the call controller instructing the calling gateway to detect the preset key combination via a mode of Digitmap or immediate report.

* * * * *